Aug. 9, 1960
F. P. FORD ET AL
2,948,695
POLYVINYL CHLORIDE COMPOSITION
CONTAINING HYDROCARBON TAR
Filed Sept. 17, 1953
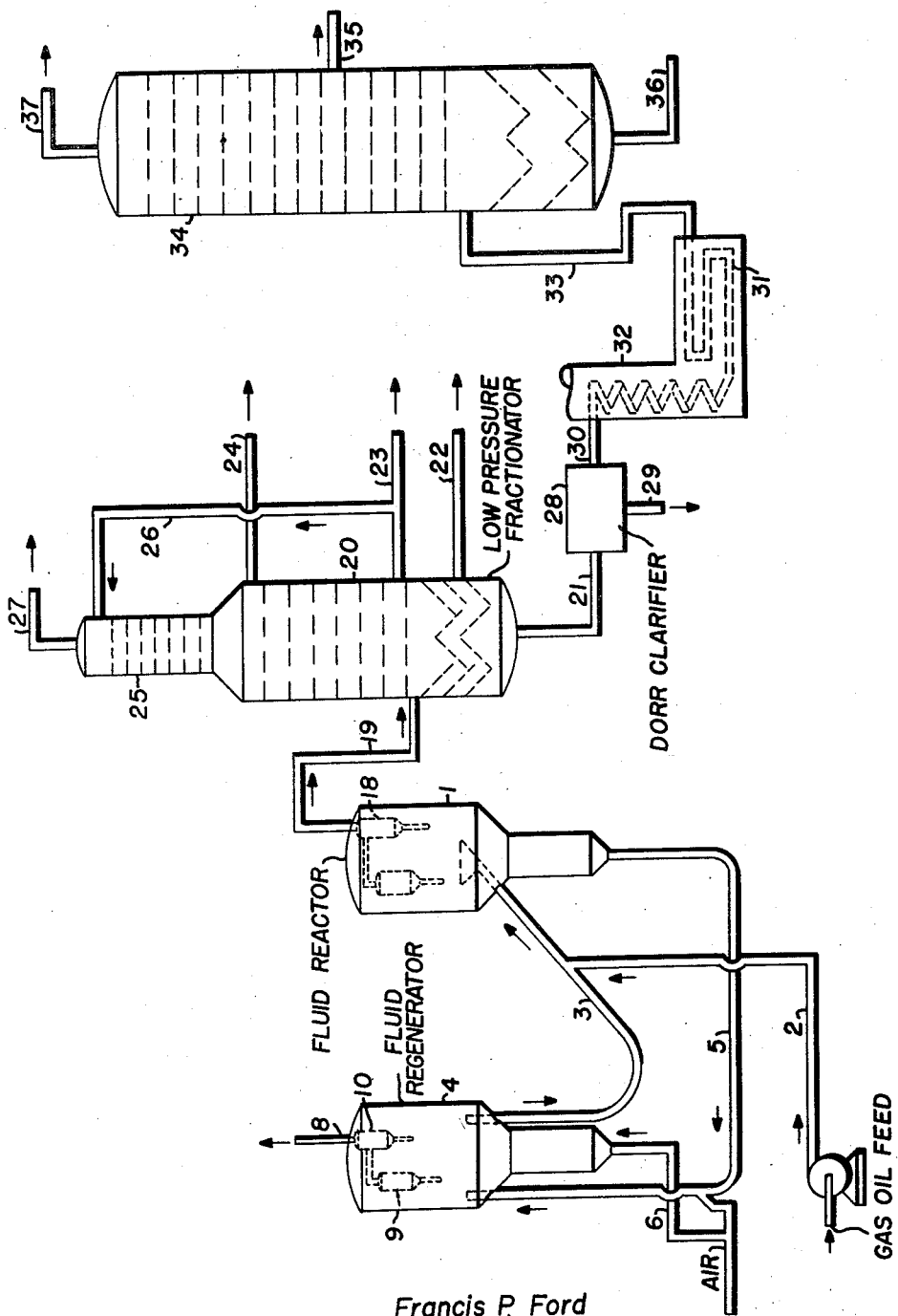
Francis P. Ford
Gabriel E. Jasper
Joseph F. Nelson
Lester M. Welch
Inventors
By W. H. Smyers  Attorney

United States Patent Office 2,948,695
Patented Aug. 9, 1960

2,948,695

POLYVINYL CHLORIDE COMPOSITION CONTAINING HYDROCARBON TAR

Francis P. Ford, Roselle, N.J., Gabriel E. Jasper, Bronxville, N.Y., and Joseph F. Nelson, Westfield, and Lester M. Welch, Madison, N.J., assignors to Esso Research and Engineering Company, a corporation of Delaware Filed Sept. 17, 1953, Ser. No. 380,724

6 Claims. (Cl. 260—28.5)

This invention relates to a new class of materials which have been discovered to be particularly effective as plasticizers for resins and rubber-like materials. In particular, this invention relates to the use of thermally cracked catalytic cycle stocks as plasticizers.

The ever expanding use of plastic materials such as vinyl chloride polymers or copolymers, polyvinyl acetate, cellulose esters, acrylate and methacrylate resins, rubbers such as the emulsion copolymers of butadiene with styrene or acrylonitrile, or the copolymers of isobutylene with small amounts of a diolefin such as isoprene have created a large demand for suitable plasticizers. Alkyl esters and particularly di-2-ethylhexyl phthalate, di-n-octyl phthalate and tri-2-ethyl-hexyl phosphate have been known to be satisfactory plasticizers for the aforementioned high molecular weight materials, but the supply of these plasticizers has been unable to keep pace with the expansion of the plastics industry, largely because of a shortage of alcohols suitable for the manufacture of desired esters.

It is the object of the invention to provide the art with a new source of plasticizers. Another object is the production of plastic compositions having superior physical and chemical properties. Still other objects will appear from the subsequent description.

It has now been discovered that catalytic cycle gas oil boiling in the range of 545° F. to about 750° F. as well as heavier fractions can be thermally cracked to produce excellent plasticizers. If desired the thermally cracked oil may be concentrated by phenol extraction which may be carried out either batchwise or continuously in a multistage liquid-liquid extraction column. These oils are particularly valuable as partial replacements for the ester type of plasticizer, and are known as thermal tars.

The properties of a plasticizer which are most important are high plasticizing efficiency and low volatility. Usually, when changes are made to improve one of these properties, the other is adversely affected. For example, an increase in alcohol molecular weight in the case of esters such as the phthalates tends to reduce volatility at the expense of plasticizing efficiency. However, the materials of this invention show the unexpected properties of both low volatility and increased flexibility at low temperatures. The plasticizers of this invention may be used alone in proportions of up to 50 parts by weight per 100 parts of polymer. However, they are more suitably used in conjunction with the usual ester-type plasticizers. In such cases, the plasticizers of the present invention are used in ratios of 5 to 40 parts of the thermal tar to 45 to 10 of the ester type per 100 parts of polymer, preferably 10 to 20 of the thermal tar to 40 to 30 of the esters. The tar, preferably, has a boiling range between 600 and 780° F. and a refractive index of about 1.56 to 1.65. Narrower fractions boiling between 630 and 740° F. are preferred. Any narrower fractions boiling within these limits, of course, are suitable. If the plasticized polyvinyl chloride is used in applications involving frequent contact with the skin, it is undesirable to use tar fractions boiling above 740° F. because of possible irritation.

For a further understanding of the invention reference may be had to the accompanying drawing in which the single figure is an elevational view generally diagrammatic, showing a flow plan embodying the improvement of the present invention.

Referring specifically to the drawing, a hydrocarbon petroleum fraction boiling in the gas oil boiling range (380–1000° F.) is introduced into fluidized solids reaction zone 1 by means of feed line 2. Reactor 1 is filled with a finely divided solid catalyst maintained by conventional means in a pseudo-liquid state by the incoming feed vapors.

The feed is introduced into the catalyst line 3 connecting regenerator 4 with reactor 1. Temperature and pressure conditions in reactor 1 are adjusted so as to secure the desired conversion of the feed oil.

The temperature can range from 750 to 1050° F. A range of 875 to 950° F. is normally used with 915° F. being typical.

Usuable pressures vary from atmospheric to 200 lbs. Five to 20 lbs. is normal with 15 lbs. being a typical example—all pressures being gauge. A silica-alumina catalyst is used.

Spent catalyst is withdrawn from reactor 1 by means of line 5 and passed into a fluidized solids regenerator unit 4 wherein temperature and pressure conditions are adjusted to secure the desired revivification of the catalyst. Air or oxygen-containing gas is introduced into regenerator 4 by means of lines 6 and 7. Combustion gases are withdrawn overhead from regenerator 4 by means of line 8. These combustion gases as they flow upwardly in zone 4 contain finely entrained particles of catalyst which particles are removed by means of cyclone separator units 9 and 10 disposed in the upper area of zone 4. The fluidized solids cracked products are removed overhead from zone 1 by means of line 19 and introduced into a distillation zone 20.

Temperature and pressure conditions are adjusted in zone 20 to remove a heavy fraction by means of line 21, a heavy gas oil fraction, referred to as heavy catalytic cycle gas oil, by means of line 22 and a light gas oil fraction by means of line 23. A fraction boiling in the motor fuel boiling range is removed by means of line 24. Gases are passed upwardly through an absorption section 25 and countercurrently contact a downflowing absorption oil which is preferably separated from the light gas oil by means of line 26 and introduced into the top of the absorption section 25. Gas substantially completely free of normally liquid hydrocarbons are removed overhead from zone 25 by means of line 27 and handled as desired.

The heavy fraction is withdrawn through line 21 and passed to clarifier 28 where entrained catalyst is settled out and removed through line 29. The clarified oil is withdrawn through line 30 and introduced into cracking coil 31 housed in furnace 32. Cracked products are withdrawn from furnace 32 through line 33 and introduced into distillation column 34 where temperature and pressure conditions are adjusted to remove a motor fuel fraction as a side stream through line 35 and a heavy tar fraction of the desired viscosity by line 36. Light gases are removed overhead through line 37. This heavy tar fraction or cuts thereof is the plasticizer of the present invention. If desired the conditions in tower 34 may be so adjusted that the distillation is carried out under vacuum thus increasing the overhead yield and increasing the viscosity of the tar bottoms. Although these bottoms are referred to as "tar" bottoms, it is to be understood that they are quite fluid. When dark in color they can be converted to light colored materials by distillation. If desired the heavy cycle gas oil from line 22 or mixtures of it with the heavy clarified oil from clarifier 28 may be satisfactorily fed to the cracking coil 31.

The conditions obtaining in the thermal cracking zone 31 are conventional and are in the range between 850° F. and 1200° F. preferably between 900° F. and 1000° F. Pressures may vary from 200 lbs. per square inch to as much as 1000 lbs. per square inch, preferably between 300 and 800 lbs. per sq. inch.

An alternative to the thermal cracking step is steam cracking, in which case pressures may vary from atmospheric to 1000 lbs. and temperature from 1200 to 1600° F.

The effectiveness of the novel materials of this invention as plasticizers is shown in the runs evaluated in Table I wherein a commercial polyvinyl chloride resin known as Geon 101 was chosen as the illustrative material. In preparing the test samples, 100 grams of the resin were dry blended by hand with 1 gram of lead stearate, 2 grams vanstay, and 25 grams of diisooctyl phthalate as a primary plasticizer. The dry blend was mixed in a beaker with 25 grams of a secondary plasticizer and stirred to give a homogeneous blend whereupon the latter was charged to a 6 x 12 inch laboratory mill heated with steam to about 280 to 320° F. The resin was then fluxed about two minutes and allowed to mill with a rolling back for five minutes with occasional cutting.

The sheeted stock was then molded at 280° F. in a standard A.S.T.M. mold (D16–41) yielding slabs 6 x 6 x 0.075 inch. The molding cycle was 10 minutes at minimum run pressure to allow free flow of the resin, followed by 10 minutes at 900 lbs./sq. inch. The molded slabs were allowed to stand near 75° F. for at least one day before testing. Several secondary plasticizers were tested in accordance with the above procedure, including the tar of the present invention as well as tars prepared solely by thermal and catalytic cracking.

The Scott inclined plane tensile tester has been used to measure the stiffness of the compounds at room temperature. Specifically the modulus at 50 and 100% extension is determined by the application of a load to the specimen by means of a weight which rolls along an inclinable plane. The load is applied at a constant rate regardless of the extensibility of the specimen by tilting the plane at a constant rate. The specimens are die cut from the calendered sheet and are 5" x 0.1" in dimension. These specimens are clamped into the machine, one end being fastened to a fixed member while the other is secured to the rolling weight. The machine has been calibrated to indicate the load for extensions up to 120% and a stress of up to 2250 lb. per square inch. The stress is recorded autographically within these limits and readings are customarily taken at 50% and 100% extensions. An adjustment in the weight of the free rolling member must be made in accordance with the actual gauge of the sheet to permit the direct recording of the stress in lbs./sq. in. The thickness is measured with a gauge accurate to .0001" and an average of five readings is taken before adjustment of the weights is made. By means of this device, measurement of the modulus can be made with an accuracy of better than ±1.0%. The results are summarized in Table I.

TABLE I

| Material | Boiling Range, °F. | Refractive Index | 50% Modulus in Vinyl [a] |
| --- | --- | --- | --- |
| Heavy Cycle Gas Oil Cut from catalytic cracking. | 530–622 | 1.5466 | Low Compatibility. |
| Do | 660–666 | 1.5466 | Do. |
| Do | 695–742 | 1.5347 | Do. |
| Heavy Heating Oil from catalytic cracking. | 578–652 | 1.5372 | 1915. |
| Tar from Thermally Cracking above Cycle Gas Oil. | 613–630 | 1.5694 | 1735. |
| Do | 673–684 | 1.6002 | 1465. |
| Do | 698–716 | 1.6097 | 1415. |
| Tar from Thermal Cracking of heavy cycle gas oil from catalytic cracking. | 604–740 | 1.5675 | 1450. |
| Tar (Broad Cut) from Thermally cracking Mixed Cycle Gas Oil and Clarified Oil from catalytic cracking. | 604–740 | 1.5931 | 1450. |
| Do | 580–734 | 1.5892 | 1520. |
| Tar from Thermal Cracking of Virgin Naphtha. | 580–740 | 1.5574 | 1725. |

[a] Recipe: Vinyl resin 100, Vanstay 2, Lead stearate 1, Diisoocyl phthalate (DIOP) 25, Secondary plasticizer 25.

From the above data it is evident that thermal cracking of a catalytic cycle stock or clarified oils give oils of good plasticizing efficiency. Thermal tar from cracking of virgin naphtha is not as effective as the tar from catalytic stocks as is evident from the higher modulus. The better plasticizers give the lower moduli figures, i.e., they render the polymer more flexible which is very desirable in the case of polyvinyl chloride. The thermal tar from catalytic stocks contains more complex ring structures and less alkyl side chains as evidenced by the difference in refractive index.

Similar results are obtained when employing a stock which has been prepared by the thermal cracking of an oil obtained by catalytic cracking and then concentrated by solvent extraction with phenol, liquid $SO_2$ or methanol or other suitable solvent. Table II gives results obtained with a cycle oil from catalytic cracking which was subjected to subsequent thermal cracking and then phenol extracted at a 3/1 solvent/oil ratio and 15% water in phenol as the solvent to give a 54.7% yield of extract which had a refractive index of 1.6330. This material was tested as obtained and also in 10 fractions. The results are shown in Table II.

TABLE II

*The effect of boiling range on plasticizer efficiency of thermal tar in vinyl compounds*

| Material | Cut No.[a] | Vol. Percent | Boiling Range, °F. | Refractive Index, $n^{20}$ | 50% Modulus in Vinyl [b] | |
| --- | --- | --- | --- | --- | --- | --- |
| | | | | | 1 day | 2 weeks |
| Thermal Tar Extract | Wide Cut. | | 395–850 | | 1380 | |
| | 1 | 10 | 395–600 | 1.5756 | too stiff to measure. | |
| | 2 | 20 | 600–630 | 1.5804 | | 1650 |
| | 3 | 30 | 630–640 | 1.5965 | 1385 | |
| | 4 | 40 | 640–690 | 1.6176 | | 1455 |
| | 5 | 50 | 690–711 | 1.6330 | 1185 | |
| | 6 | 60 | 711–718 | 1.6414 | | 1310 |
| | 7 | 70 | 718–737 | 1.6460 | 1250 | |
| | 8 | 80 | 737–782 | 1.6502 | | 1420 |
| | 9 | 90 | 782–820 | 1.6651 | 1535 | |

[a] Cuts obtained by fractionating in a 15 plate Oldershaw column at a reflux ratio of 3 to 1.
[b] Recipe: Vinyl resin 100, Vanstay 2, Lead stearate 1, diisooctyl phthalate 25, Oil 25.

The above data show that the extract is an efficient plasticizer for vinyl resins.

However, considerable improvement in efficiency can be obtained by discarding both the lighter ends and the heavier ends. A good efficiency is obtained at about 600 to 780° F. boiling range and a refractive index of about 1.60 to 1.65. The optimum fraction has a boiling range of about 630 to 740° F. Any fraction within this range is suitable. If the plasticized polyvinyl chloride is used in applications involving frequent contact with the skin, fractions boiling above about 740° F. are undesirable. They may cause irritation of the skin upon sufficiently long contact.

Even better results can be obtained by blending the highest and lowest cuts. Table III gives results obtained with a cycle oil from catalytic cracking which was then thermally cracked, phenol extracted and fractionated and the lowest and highest cuts reblended.

TABLE III

| Material | Boiling Range, °F. | Percent Plast. Loss on Milling | 50% Inclined Plane Modulus | | | Torsional Modulus × 10⁻³ | | | | |
|---|---|---|---|---|---|---|---|---|---|---|
| | | | 1 Day | 7 Days | 4 Weeks | +25 | +15 | 0 | −15 | −25° C. |
| Thermal Tar Extract: | | | | | | | | | | |
| 1. Wide Cut | 446–825 | 13.6 | 1490 | 1710 | | 6.0 | 27.4 | 132.5 | 286 | 347 |
| 2. Lowest Cut | 622–640 | 22.2 | 1385 | 1555 | 1660 | 5.6 | 22.5 | 117.4 | 225.0 | 300.0 |
| 3. Highest Cut | 785–820 | 5.0 | 1535 | 1570 | 1780 | 5.4 | 29.4 | 139.5 | 279.0 | 349.0 |
| 4. Blend of equal parts of 2 and 3 | | 6.8 | 1330 | 1530 | | 3.7 | 16.0 | 104 | 237 | 300 |

The terms "thermal cracking" and "thermally cracking" if employed in the claims are defined to include conventional thermal cracking and also thermal cracking in the presence of steam which is often referred to as steam cracking.

Obviously resort may be had to various modifications and variations without departing from the spirit of the invention or the scope of the appended claims.

The nature of the present invention having been thus generally set forth and specific examples of the same given, what is claimed as new and useful and desired to be secured by Letters Patent is:

1. A composition of matter with increased flexibility comprising polyvinyl chloride and a wax-free, asphaltene-free heavy tar; said heavy tar being prepared by providing a hydrocarbon petroleum fraction with a boiling range of about 380° to 1000° F.; cracking said hydrocarbon petroleum fraction at a temperature between 750° and 1050° F. in the presence of a finely divided silica-alumina catalyst; distilling said cracked petroleum fraction to produce a heavy, gas-oil fraction boiling in the range of about 545° to 750° F.; subjecting said heavy, gas-oil fraction to thermal cracking at a temperature between about 850° and 1200° F.; and distilling said cracked, gas-oil fraction to produce said heavy tar with a boiling range between about 600° and 780° F. and a refractive index between about 1.56 and 1.65.

2. A composition of matter with increased flexibility comprising 100 parts of polyvinyl chloride and 5 to 40 parts of a wax-free, asphaltene-free heavy tar; said heavy tar being prepared by providing a hydrocarbon petroleum fraction with a boiling range of about 380° to 1000° F.; cracking said hydrocarbon petroleum fraction in the presence of a finely divided silica-alumina catalyst at a temperature between about 750° and 1050° F.; distilling said cracked petroleum fraction to produce a heavy, gas-oil fraction boiling in the range of about 545° to 750° F.; subjecting said heavy, gas-oil fraction to thermal cracking at a temperature between 850° and 1200° F.; and distilling said cracked gas-oil fraction to produce said heavy tar with a boiling range between about 600° and 780° F. and a refractive index between about 1.56 and 1.65.

3. A composition of matter with increased flexibility comprising 100 parts of polyvinyl chloride, 10 to 45 parts of an alkyl ester selected from the group consisting of di-2-ethylhexyl phthalate, di-n-octyl phthalate, tri-2-ethylhexyl phosphate, and mixtures thereof, and 5 to 40 parts of a wax-free, asphaltene-free heavy tar; said heavy tar being prepared by providing a hydrocarbon petroleum fraction with a boiling range of about 380° to 1000° F.; cracking said hydrocarbon petroleum fraction in the presence of a finely divided silica-alumina catalyst at a temperature between about 750° and 1050° F.; distilling said cracked petroleum fraction to produce a heavy, gas-oil fraction boiling in the range of about 545° to 750° F.; subjecting said heavy, gas-oil fraction to thermal cracking at a temperature between about 850° and 1200° F.; distilling said cracked gas-oil fraction to produce said heavy tar with a boiling range between about 600° and 780° F. and a refractive index between about 1.56 and 1.65.

4. A composition of matter according to claim 3 in which the alkyl ester is di-n-octyl phthalate.

5. A composition of matter according to claim 3 in which the alkyl ester is di-2-ethylhexyl phthalate.

6. A composition of matter according to claim 3 in which the alkyl ester is tri-2-ethylhexyl phosphate.

References Cited in the file of this patent

UNITED STATES PATENTS

| 2,464,219 | Doyle et al. | Mar. 15, 1949 |
| 2,698,280 | Hersberger et al. | Dec. 28, 1954 |

FOREIGN PATENTS

| 562,956 | Great Britain | July 24, 1944 |